United States Patent
Gruenwald

(10) Patent No.: US 12,459,022 B2
(45) Date of Patent: Nov. 4, 2025

(54) WIRE ASSEMBLY DEVICE

(71) Applicant: SW AUTOMATISIERUNG GMBH, Golling an der Salzach (AT)

(72) Inventor: Felix Gruenwald, Bischofshofen (AT)

(73) Assignee: SW AUTOMATISIERUNG GMBH, Golling an der Salzach (AT)

( * ) Notice: Subject to any disclaimer, the term of this patent is extended or adjusted under 35 U.S.C. 154(b) by 600 days.

(21) Appl. No.: 17/842,053

(22) Filed: Jun. 16, 2022

(65) Prior Publication Data

US 2022/0402009 A1 Dec. 22, 2022

(30) Foreign Application Priority Data

Jun. 18, 2021 (AT) .............................. A 50494/2021

(51) Int. Cl.
*B21C 47/14* (2006.01)
(52) U.S. Cl.
CPC .................................. *B21C 47/14* (2013.01)
(58) Field of Classification Search
CPC ................................ B21C 47/14; H01R 43/28
See application file for complete search history.

(56) References Cited

U.S. PATENT DOCUMENTS

| | | | |
|---|---|---|---|
| 5,852,958 A * | 12/1998 | Araki | H01R 43/28 81/9.51 |
| 10,854,358 B2 | 12/2020 | Takada et al. | |
| 11,251,577 B2 | 2/2022 | Schauer | |
| 2019/0066881 A1 | 2/2019 | Takada et al. | |
| 2019/0386448 A1 | 12/2019 | Schauer | |
| 2022/0402009 A1 * | 12/2022 | Gruenwald | B21C 47/14 |

FOREIGN PATENT DOCUMENTS

| | | |
|---|---|---|
| DE | 197 56 978 | 9/1999 |
| DE | 10 2015 110 755 | 1/2017 |
| WO | 2017/208717 | 4/2017 |
| WO | 2018/165688 | 9/2018 |

* cited by examiner

*Primary Examiner* — Minh N Trinh
(74) *Attorney, Agent, or Firm* — Wenderoth, Lind & Ponack, L.L.P.

(57) ABSTRACT

An assembly device for assembling or pre-assembling wire portions includes an arrangement device detachably attached to the assembly device to receive the assembled or pre-assembled wire portions. The arrangement device includes a main body and a slit at least partially extending along a longitudinal extent of the main body to string the wire portions along the slit. The arrangement device includes an adjustment device for adjusting a slit width of the slit.

22 Claims, 13 Drawing Sheets

WIRE ASSEMBLY DEVICE

BACKGROUND OF THE INVENTION

The invention relates to an assembly device for assembling or pre-assembling wire portions, with at least one arrangement device which is or can be detachably attached to the assembly device, for receiving the assembled or pre-assembled wire portions.

In the context of the present disclosure, the term "wire" covers individual insulated or bare wires, single-core or multi-core wires or sheathed cables, cable strands, stranded cores, glass fibre cables or the like. One wire portion can be various elements. The term "wire portion" refers, for example, to multi-core or single-core wires or sheathed cables, individual insulated or bare wires, cable strands, complete cable harnesses, stranded cores, glass fibre cables or the like.

Assembly devices with arrangement devices which can be detachably attached thereto for receiving the wire portions that have been assembled or pre-assembled by the assembly device are already known. For instance, WO 2018/165688 A1 discloses an assembly device of this kind. The detachable arrangement device comprises a main body in the form of a hollow-chamber profile. In the main body there is formed a slit, which extends along a longitudinal extent of the main body, for stringing the wire portions which have been assembled or pre-assembled by the assembly device along the slit. In the assembly device, the ends of the wire portions are worked (assembly or pre-assembly), preferably in an automated or semi-automated manner, during which a wire portion is, in most cases, provided with a wire termination. A correspondingly assembled or pre-assembled wire portion is form-fittingly inserted into the slit in the arrangement device, each wire termination resting on the main-body portions that delimit the slit.

Owing to the slit extending along the longitudinal extent of the main body, the prefabricated wire portions can be inserted along the arrangement device sequentially, in the order in which they will be needed at their future installation site. The arrangement device receives the wire portions within itself and can be transported from one location to another. In the process, the slit prevents the sequence of the wire portions from changing. This ensures that the individual wire portions are in the correct sequence at the point of use where the wire portions are to be installed. The slit also guarantees that it is possible to receive different wire portions with different lengths and different ends or terminations. The individual lined-up wire portions have substantially the same cross section. At one end of each wire portion, there is a wire termination that prevents the wire portion from sliding out of the slit, e.g. in the form of a wire end ferrule, a cable lug, a flat connector or a similar element. However, a cable support sleeve, a retaining ring or the like can also be fitted on the wire portion to prevent it from slipping out of the slit.

A disadvantage of the known assembly devices is that a separate arrangement device is required for each wire diameter or for the end-working that is applied.

SUMMARY OF THE INVENTION

An object of the invention is to avoid the above-described disadvantages and to provide an assembly device that is improved compared with the prior art.

In the invention, the at least one arrangement device comprises an adjustment apparatus for adjusting a slit width of the slit.

As a result, the slit size can be tailored specifically to the required wire diameter. This provides the key advantage that a user of the assembly device can adjust the arrangement devices specifically to their requirements. In particular, an arrangement device can consequently be used multiple times.

In a preferred embodiment variant, the adjustment device comprises at least one rail arranged on the main body, the at least one rail being arranged so as to be movable relative to the main body, preferably in a direction transverse to the longitudinal extent. For example, a projection in the form of a metal sheet can be arranged on the main body, which projection forms a first slit width end. The end of the movable rail that is on the outside in the direction of the projection represents a second slit width end. Since the rail is movably arranged on the main body, the second slit width end can be moved relative to the first slit width end, as a result of which the slit width (from the first slit width end to the second slit width end) can be adjusted in a simple manner.

In the process, the at least one rail is mounted on the main body in a translatory manner, preferably by a linear guide.

According to a preferred embodiment variant, the main body has at least one slot that preferably runs in a direction transverse to the longitudinal extent, at least one fastener, preferably in the form of a screw, protruding through the at least one rail and through the at least one slot. The at least one rail is movable along the at least one slot relative to the main body, and is fastenable to the main body by the at least one fastener. In particular, the fasteners can be screws that protrude through holes in the at least one rail and through slots in the main body and engage in corresponding threaded bushings on the main body. When the screws are in the loosened state, the at least one rail can be moved along the slots (the screws acting as guide pins in the process), and, at the desired slit width, the at least one rail can be secured to the main body in a simple manner by tightening the screws, clamping the at least one rail between the screws and the main body.

It is also possible for the at least one rail to have at least one slot that preferably runs in a direction transverse to the longitudinal extent (LE), at least one fastener, preferably in the form of a screw, protruding through the at least one slot, the at least one rail being movable along the at least one slot relative to the main body and being fastenable to the main body by the at least one fastener. In other words, the slots for moving the at least one rail are in this case not formed in the main body, but rather in the at least one rail itself.

Preferably, the at least one rail extends along the longitudinal extent, preferably substantially along the entire slit. As a result, the slit width can be adjusted in a simple manner along the entire slit.

In a preferred embodiment, the at least one rail is movable relative to the main body in steps or in a continuous manner. If the at least one rail is movable in a continuous manner, any desired slit width can be set. If the at least one rail is movable in steps, for example by guiding the at least one rail in a grid guide, preferred slit widths can be set in a simple manner by locking the at least one rail at predeterminable distances that correspond to preferred slit widths.

Preferably, the position of the at least one rail relative to the main body is lockable. The at least one rail can thus be locked at the desired slit width. If a different slit width is desired, the locking can be released again, and a different slit width can be set.

In a preferred embodiment variant, a projection is arranged on the main body, the projection forming a first slit width end, a second slit width end being represented by an end of the at least one rail that is on the outside in the direction of the projection. The second slit width end is movable relative to the first slit width end to adjust the slit width owing to the at least one rail being movably arranged on the main body. As a result, the slit width (from the first slit width end to the second slit width end) can be adjusted in a simple manner. By way of example, the projection may be in the form of a doubled-over metal sheet portion of the main body or may be attached to the main body in a stationary manner.

According to a particularly preferred embodiment, the adjustment device comprises two rails that are movable relative to the main body transversely to the longitudinal extent and that can be moved towards one another and/or away from one another in order to adjust the slit width. In this case, the end of the first rail facing the second rail forms a first slit width end, and the end of the second rail facing the first rail forms a second slit width end. If the two rails move towards one another, the slit width (from the first slit width end to the second slit width end) can thus be reduced, and if the two rails move away from one another, the slit width can be increased.

Preferably, the main body is formed by a rod profile, preferably in the form of a hollow-chamber profile. This results in a space-saving and stable arrangement device. In particular, a hollow-chamber profile has high stability. In addition, this can ensure that the wire terminations are protected since they are located inside the hollow-chamber profile. For example, in one variant, the main body is formed by a square or polygonal hollow profile having longitudinal slots on one side, at least one end of the hollow profile remaining open for threading in the individual wire portions and the other end of the hollow profile being closed at least in some portions in order to form a stop.

In a preferred embodiment, the slit has a first end and a second end, the first end having an insertion portion for inserting the individual wire portions, the second end preferably having a stop portion for stopping the wire portions.

The insertion portion facilitates the process of threading in the wire portions. The insertion portion can be formed by a funnel-shaped mouth of the slit for facilitating a manual insertion or an automated insertion. This funnel-shaped mouth can be formed by concave recesses that continue into the slit. However, a mouth of this kind can also be formed by a funnel with oblique straight sides that open into the slit.

The stop portion prevents the wire portions from falling out of the slit. Where the stop portion is formed by a closure of the slit and/or a fold on the main body, a simple structural measure achieves the advantage that the wire portions cannot slip out of the slit during transportation or when the arrangement device is being loaded.

According to a preferred embodiment, at least one closure device is attachable or arranged at or in the slit, and the closure device makes it possible to prevent the wire portions from sliding out of the slit. Once the arrangement device has been loaded, the closure device prevents some or all of the wire portions from being able to fall out of the device. This is achieved, for example, by forming the closure device using a locking element that covers the slit at least in some portions and is arranged on the main body in a movably mounted manner. The closure device can thus be formed by a kind of flap or a bolt that can be manually or automatically closed once the arrangement device has been loaded. However, instead of the locking element arranged on the main body in a movably mounted manner, it is also possible to use an element that is separate from the main body and pushed over the slit or inserted into the slit.

Preferably, the assembly device comprises a plurality of assembled or pre-assembled wire portions, at least one wire termination being arranged on each wire portion. The slit has a minimum slit width which substantially corresponds to a wire diameter of the wire portions, and a maximum slit width which is smaller than the termination diameter of the wire terminations. These dimensions of the slit width ensure that the wire portions can be strung along the arrangement device in a smooth manner. Owing to the larger diameter of the wire terminations arranged on the wire portion, the wire portions are prevented from falling out of the slit. In particular, the connection between the plurality of assembled or pre-assembled wire portions and the arrangement device is form-fitting.

The assembled or pre-assembled wire portions can also be wire portions that have no insulation at least in some portions and thus form a stranded core. In this case, this is a partially stripped section of these wire portions. This partially stripped section in which the wire portion has no insulation, can also be used for mounting the wire portion by the slit having a minimum slit width which substantially corresponds to a stranded-core diameter of the stripped portion of the individual wire portions, and by having a maximum slit width which is smaller than the wire diameter of the insulated wire portion. When the partially stripped wire portion is used at the installation site, it is for example removed from the slit in a simple manner only in an orthogonal manner. In the process, the insulation is removed by the counter-bearing of the slit and the wire portion is fully stripped at the contact site.

In general, it is advantageous for the connection between the assembled or pre-assembled wire portions and the arrangement device to be form-fitting. Introducing the wire portions into the arrangement device, and also removing the wire portions, is thus simple and uncomplicated. The form fit ensures that the wire portions cannot fall out of the slit. They are thus kept in the desired order in the slit in the arrangement device.

Preferably, a transfer device may be provided for transferring the assembled or pre-assembled wire portions from the assembly device into the at least one arrangement device. As a result, the individual wire portions can be produced and arranged in an automated manner. The transfer device takes the individual assembled or pre-assembled wire portions and loads the individual arrangement devices according to the desired sequence. The transfer device can, for example, be in the form of a robot that removes various wire portions from various assembly devices and arranges them successively in at least one arrangement device according to the desired sequence. By way of example, three different assembly devices produce three different wire portions. These have to be inserted in an arrangement device arranged in a predetermined sequence. The robot serving as transfer device takes the relevant wire portion from the relevant assembly device in accordance with the predetermined sequence and transfers it to the corresponding arrangement device.

An advancing device for shifting the individual wire portions along the arrangement device can also be provided, thereby ensuring that the wire portions can all be received by the arrangement device. This can additionally be done by forming the transfer device and the advancing device using a shared device, for example a robot. However, the advancing device can also be formed, e.g., by a conveyor belt, a shaker, an air nozzle, etc.

It has been found to be particularly advantageous if the at least one arrangement device is arranged on the assembly device such that the longitudinal extents of the main body and the slit extending therein are positioned obliquely to the horizontal plane. As a result, the wire portions are able to slide down along the slit under the effect of gravity, preferably as far as a stop portion or the closest wire portion. As a result, an advancing device is not needed since gravity generates the required force for positioning the wire portions accordingly. Positioning the arrangement device obliquely also saves on space since the discharge thereof does not reach as far away from the assembly device as when in a horizontally oriented state.

BRIEF DESCRIPTION OF THE DRAWINGS

Further details and advantages of the present invention will be explained in more detail below with reference to the drawings, in which.

DETAILED DESCRIPTION OF THE INVENTION

Figure 1:
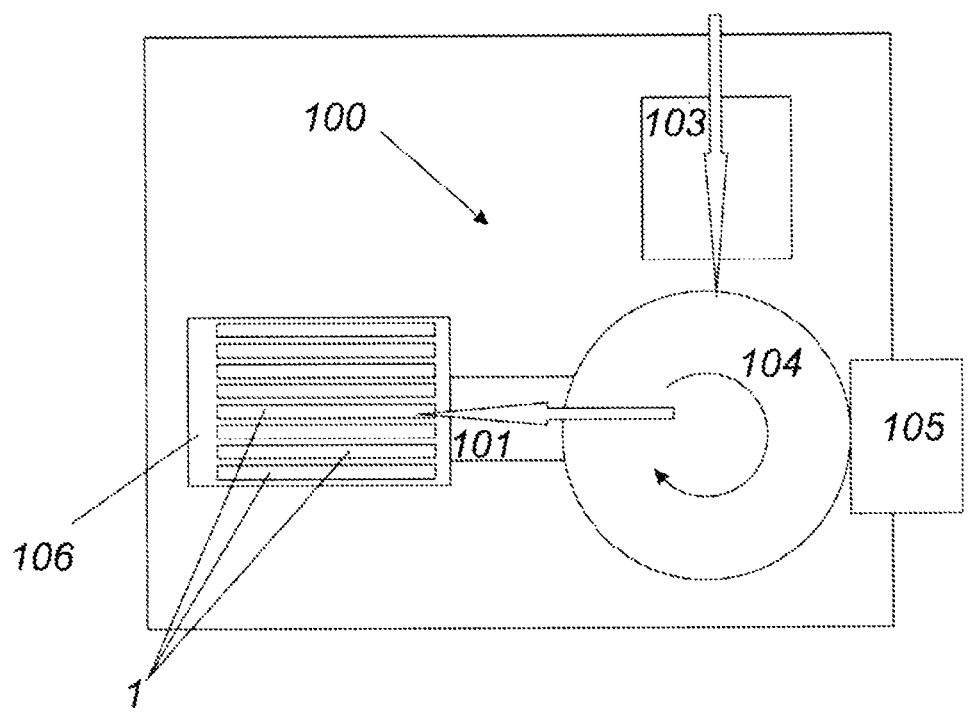
FIG. 1 is a plan view of a schematically illustrated assembly device.

FIG. 1 shows the plan view of a schematically illustrated assembly device 100, comprising a supply portion 103, which transfers wire portions 10, or the wire terminations 11 to be attached to the wire portions 10, to a preparation portion 104. The working portion 105 assembles the wire portions 10. To do so, the wire is, for example, cut to length, stripped, partially stripped, and crimped, pressed, soldered, glued or shrunk-on to wire terminations 11. By way of a transfer device 101, the wire portions 10 pre-assembled in this manner reach the corresponding arrangement devices 1 which are detachably attached to the assembly device 100 and located in the removal portion 106 on the assembly device 100.

Figure 2:
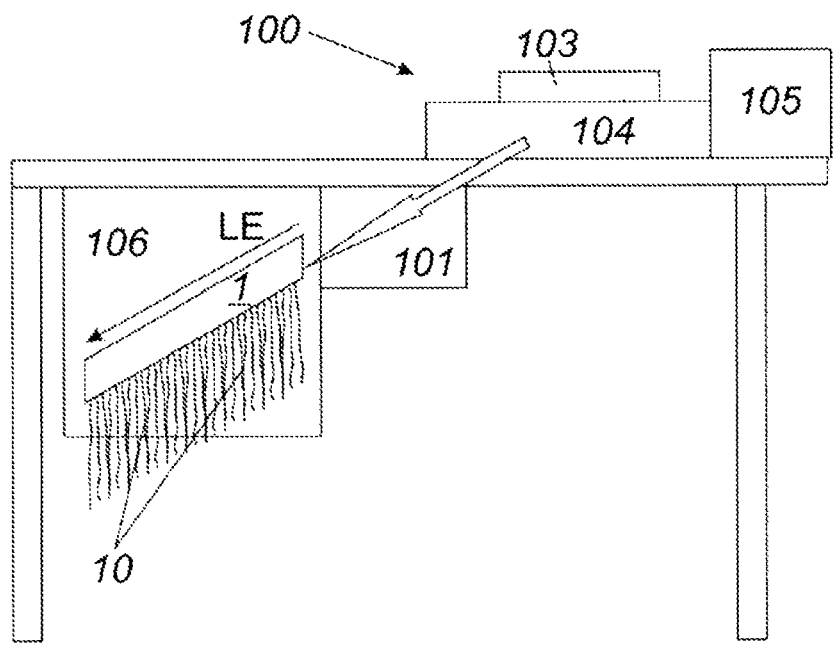
FIG. 2 is a side view of the assembly device from FIG. 1.

FIG. 2 is a side view of the schematic construction. It can be seen that, in this example, the arrangement devices 1 are oriented obliquely to the horizontal axis in order to cause the wire portions 10 to slide along under the effect of gravity. The angle between the longitudinal extent (longitudinal axis) LE of an arrangement device 1 and the horizontal axis is in a range between 0° and 90°, particularly preferably between 10° and 80°.

Figure 3:
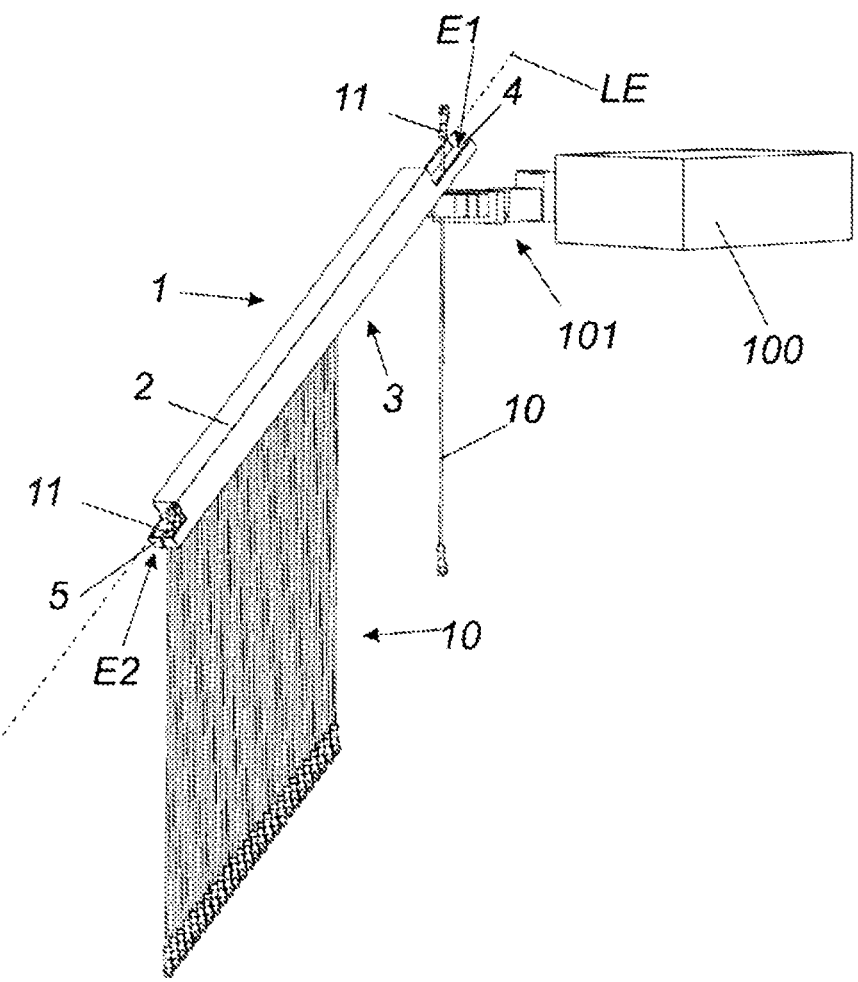
FIG. 3 shows an embodiment of a proposed assembly device with an arrangement device arranged obliquely to the horizontal on the assembly device.

FIG. 3 shows a schematically illustrated assembly device 100 for assembling or pre-assembling wire portions 10, with an arrangement device 1 which is detachably attached to the assembly device 100 for receiving the assembled or pre-assembled wire portions 10.

The arrangement device 1 comprises a main body 2 and a slit 4 which extends at least partially along a longitudinal extent (axis) LE of the main body 2 for stringing the wire portions 10 along the slit 4. As evident from, for example, FIGS. 3-4, 7, and 8, the slit width SB is the distance between two opposed free longitudinally-extending ends of the arrangement device 1. To adjust a slit width SB of the slit 4, the arrangement device 1 comprises an adjustment device 3, not visible in this view.

The arrangement device 1 is detachably attached to the assembly device 100. For example, it is fitted on the assembly device 100 by brackets. Once the arrangement device 1 has been filled, it can be removed from the assembly device 100 in a simple manner and transported to the point of use. Once the installation work is complete, the emptied arrangement device 1 can be re-attached to the assembly device 100 to be filled. No waste is produced, and resources are saved since the arrangement device 1 is intended for multiple use.

On the assembly device 100 there is a schematically illustrated transfer device 101, which can be formed, for example, as a robot arm. By way of the transfer device 101, the individual pre-assembled wire portions 10 with wire terminations 11 arranged thereon arrive, from the assembly device 100, at the first end E1 of the arrangement device 1 and the slit 4, where they are inserted into the slit 4. Due to the oblique orientation of the arrangement device 1, and due to the overlap formed by the wire termination 11, the wire portion 10 slides along the longitudinal axis LE of the main body 2 as far as a stop portion 5 on the main body 2 of the arrangement device 1 or as far as the closest wire portion 10. Here, the stop portion 5 is located at the second end E2 of the arrangement device 1 and the slit 4. The arrangement device 1 shown here includes a main body 2 with a rectangular cross section and a hollow profile. It can be seen that the wire terminations 11 on the top end of the wire portions 10 are protected by the closed form of the arrangement device 1. The closed design of the main body 2 also rules out the wire portions slipping out upwards. It is thus ensured that all the wire portions 10 are kept in the right order and the right number in the arrangement device 1 once the arrangement device 1 has been loaded.

Figure 4:
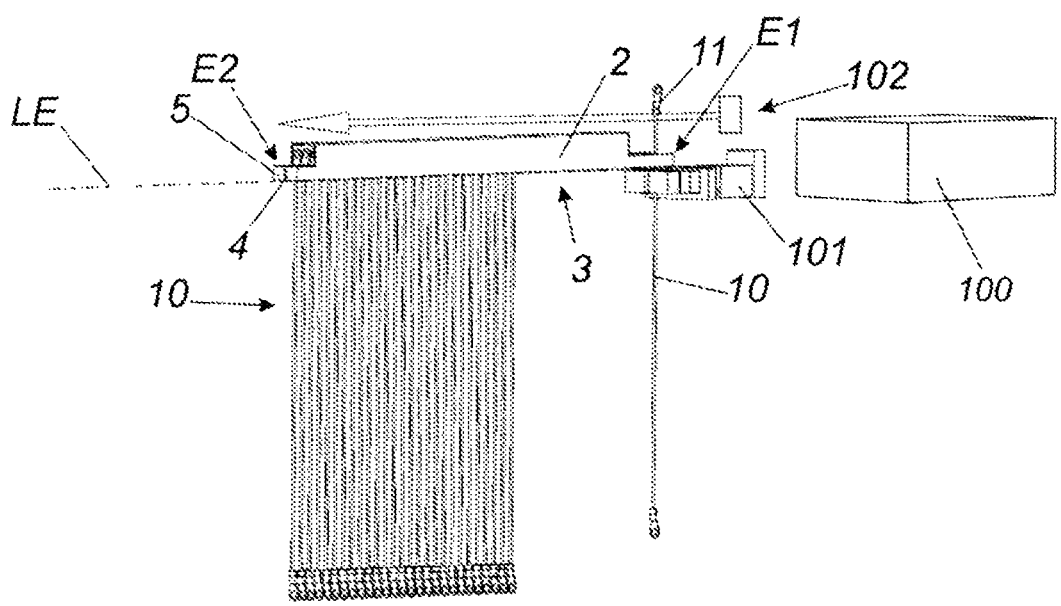
FIG. 4 shows an embodiment of a proposed assembly device with an arrangement device arranged substantially horizontally on the assembly device.

FIG. 4 shows a further variant of a schematically illustrated assembly device 100, although several assembly devices 100 can also be provided. The transfer device 101 removes the relevant wire portions 10 and inserts them at the first end E1 of the arrangement device 1. A schematically illustrated advancing device 102 provides the necessary advance along the longitudinal axis LE of the arrangement device 1 as far as the stop portion 5 at the second end E2 or as far as the closest wire portion 10 which was inserted previously. Of course, the transfer device 101 and the advancing device 102 can be formed using just one device (i.e., as the same device with two functions). This could be a robot with a gripper, for example. In this case, the angle between the arrangement device 1 and the assembly device 100 is not critical for the function of inserting the individual wire portions 10 since the individual wire portions 10 are advanced by the advancing device 102, not by gravity. By way of example, the arrangement device 1 can thus point obliquely upwards, be oriented horizontally, point obliquely downwards or be arranged at any other angle.

Figure 5:
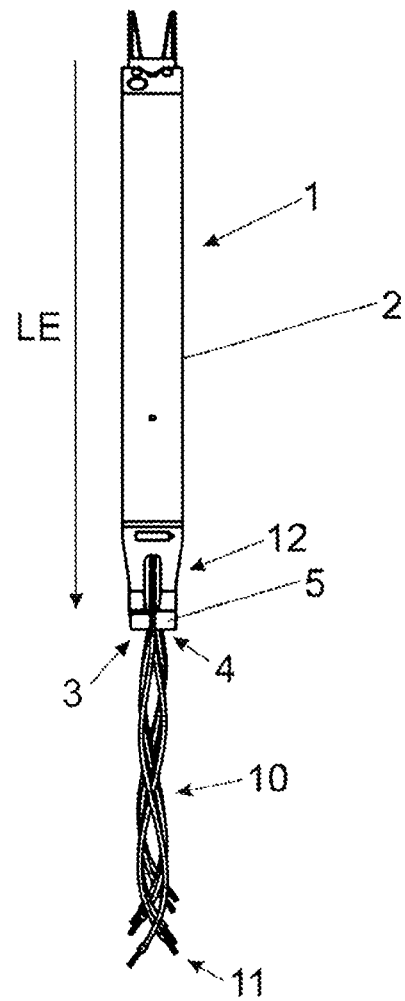
FIG. 5 shows an embodiment of proposed arrangement device in a plan view.
Figure 6:
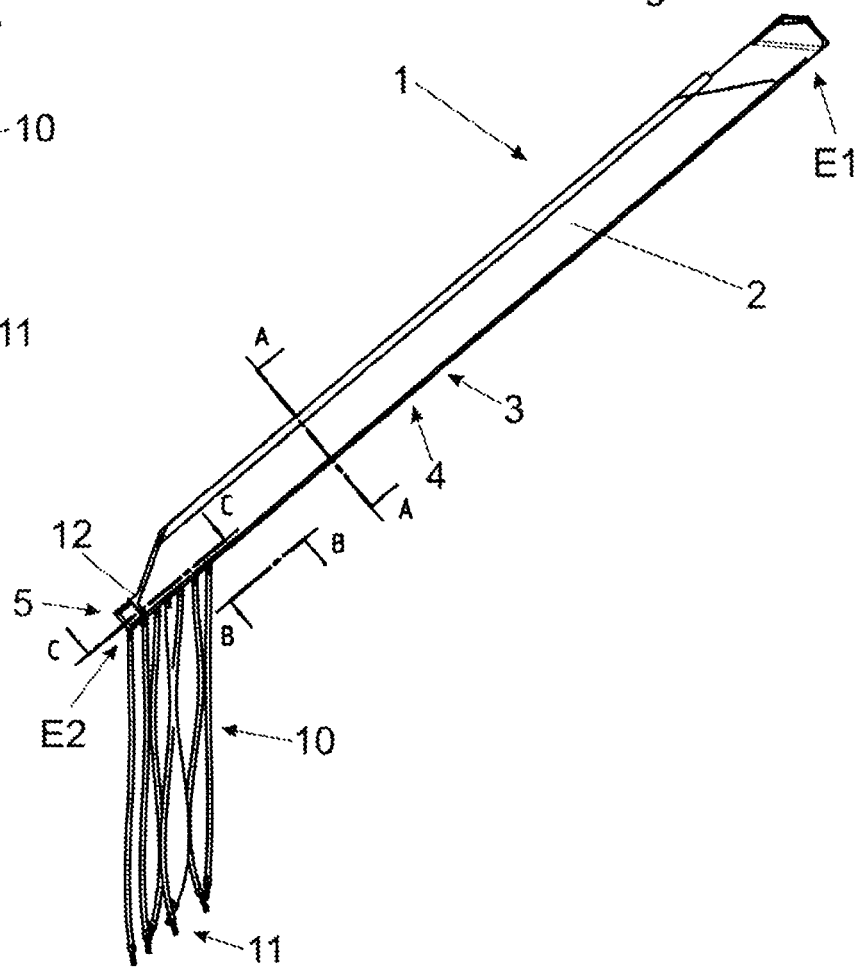
FIG. 6 shows the arrangement device from FIG. 5 in a side view.
Figure 7:
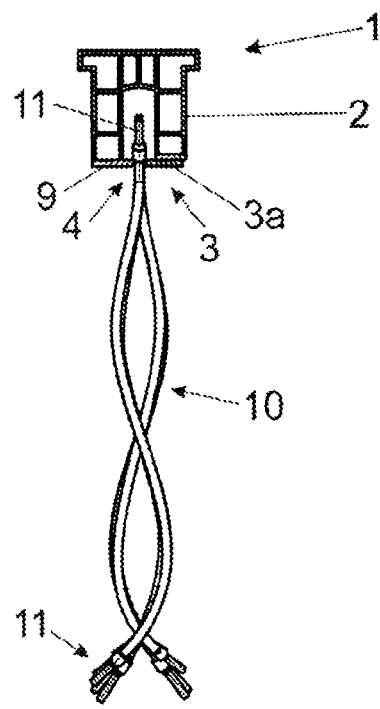
FIG. 7 is a sectional view according to sight line A-A in FIG. 6.
Figure 8:
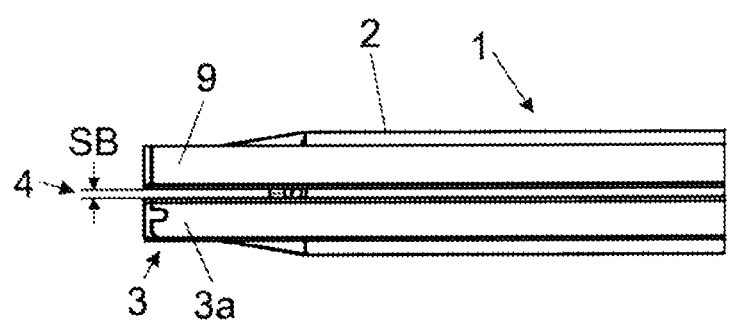
FIG. 8 is a partial view according to sight line B-B in FIG. 6.
Figure 9:
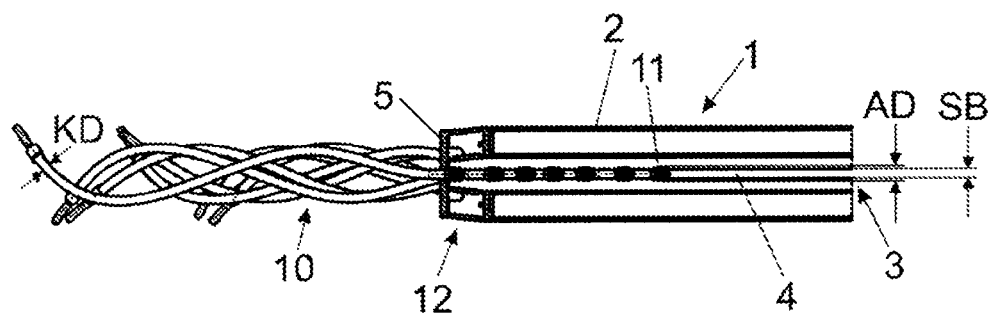
FIG. 9 is a partial view according to sight line C-C in FIG. 6.

FIG. 5 shows an embodiment of a proposed arrangement device 1 in a plan view, FIG. 6 shows the arrangement device 1 in a side view, FIG. 7 shows a sectional view according to sight line A-A in FIG. 6, FIG. 8 shows a partial view according to sight line B-B in FIG. 6, and FIG. 9 shows a partial view according to sight line C-C in FIG. 6.

The arrangement device 1 comprises a main body 2 formed by a rod profile in the form of a hollow-chamber profile (see in particular FIG. 7). Along the longitudinal axis LE of the main body 2 a slit 4 extends for stringing wire portions 10 which have been provided by an assembly device 100 along the slit 4. To adjust a slit width SB of the slit 4, the arrangement device 1 comprises an adjustment device 3 (see FIG. 8). The adjustment device 3 comprises a rail 3*a* arranged on the main body 2, which rail is arranged so as to be movable relative to the main body 2 in a direction transverse to the longitudinal axis LE. The rail 3*a* is mounted on the main body 2 in a translatory manner by a linear guide, not illustrated in more detail here. A projection 9 in the form of a doubled-over metal sheet portion that forms a first slit width end is arranged on the main body 2 of the arrangement device 1 shown (see FIG. 7). The end of the movable rail 3*a* on the outside in the direction of (closest to) the projection 9 represents a second slit width end. Since the rail 3*a* is movably arranged on the main body 2, the second slit width end can be moved relative to the first slit width end of projection 9, as a result of which the slit width SB (i.e., the distance from the first slit width end to the second slit width end) can be adjusted in a simple manner (see FIG. 8). The rail 3*a* extends along the longitudinal axis LE substantially along the entire slit 4, with the result that the slit width SB can be adjusted along the entire slit 4 in a simple manner. To fix the adjusted slit width SB, the rail 3*a* can be locked relative to the main body 2.

The wire portions 10 which comprise wire terminations 11 arranged thereon on both sides, and which are provided by an assembly device 100, are threaded in at a first end E1 of the slit 4 and moved in the direction of the second end E2 of the slit 4 (e.g., under the effect of gravity or by a corresponding advancing device 102). A stop portion 5 for stopping the wire portions 10 is arranged at the second end E2 of the slit 4. In this example, the stop portion 5 is arranged on a termination apparatus 12 that can be fitted on an end of the main body 2. The termination apparatus 12 terminates the arrangement device 1 in the region of the second end E2 of the slit 4.

The slit 4 has a slit width SB that substantially corresponds to a wire diameter KD of the wire portions 10, the slit width SB being smaller than a termination diameter AD of the wire terminations 11. These dimensions of the slit width SB ensure that the wire portions 10 can be strung along the slit 4 in the arrangement device 1 in a smooth manner. Due to the larger termination diameter AD of the wire terminations 11 arranged on the wire portion 10, the wire portions are prevented from falling out of the slit 4. In particular, the connection between the assembled or pre-assembled wire portions 10 and the arrangement device 1 is form-fitting since each wire termination 11 rests on the portions of the main body 2 that delimit the slit 4 (formed by projection 9 and rail 3*a* in the example shown).

Figure 10:
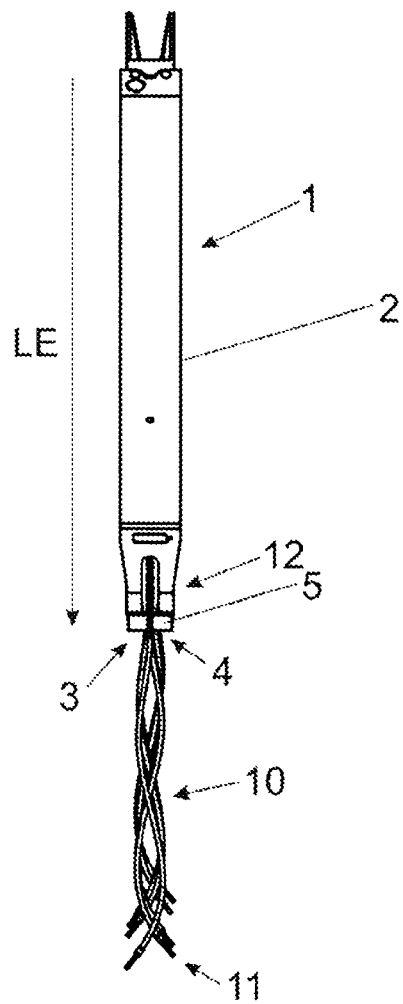
FIG. 10 shows a further embodiment of a proposed arrangement device in a plan view.
Figure 11:
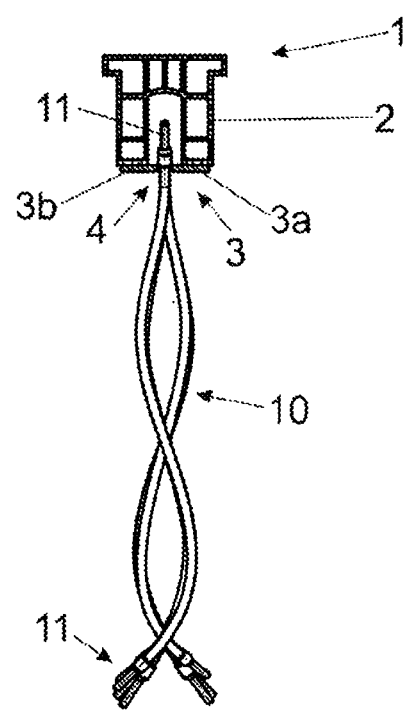
FIG. 11 is a sectional view of the arrangement device from FIG. 10.
Figure 12:
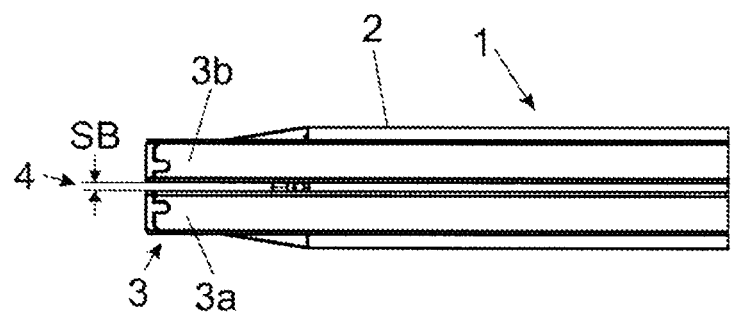
FIG. 12 is a partial view of the arrangement device from FIG. 10, FIGS. 13a, 13b are plan views of an end of a proposed arrangement device with a closure device.

FIG. 10 shows a further embodiment of a proposed arrangement device 1 in a plan view, FIG. 11 shows a sectional view of the arrangement device 1 according to FIG. 7, and FIG. 12 shows a partial view of the arrangement device 1 according to FIG. 8.

The adjustment device 3 of this embodiment comprises two rails that are movable relative to the main body 2 transversely to the longitudinal axis LE: a first rail 3*a* and a second rail 3*b* that can be moved towards one another and/or away from one another in order to adjust the slit width SB. In the process, the end of the first rail 3*a* facing the second rail 3*b* forms a first slit width end, and the end of the second rail 3*b* facing the first rail 3*a* forms a second slit width end. If the two rails 3*a*, 3*b* move towards one another, the slit width SB (from the first slit width end to the second slit width end) can thus be reduced. If the two rails 3*a*, 3*b* move away from one another, on the other hand, the slit width SB can be increased.

FIGS. 13*a* to 15 show plan views of proposed arrangement devices 1 in the region of the first end E1 of the slit 4. In each case here, a funnel-shaped insertion portion 6 opening into the slit 4 is formed at the first end E1 of the slit 4. The insertion portion 6 facilitates the insertion of the wire portions 10 with the wire terminations 11 attached thereto. One part of the main body 2 above or opposite the slit 4 has been made available to simplify the insertion of the wire portions 10.

Figure 13A:
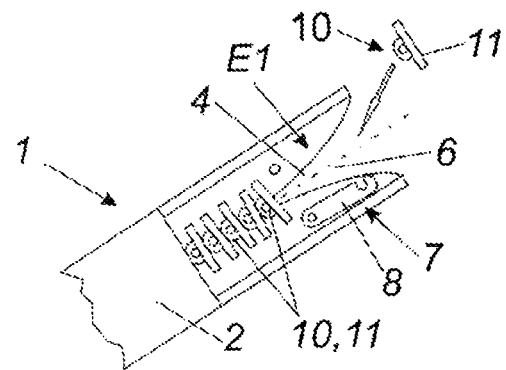
Figure 13B:
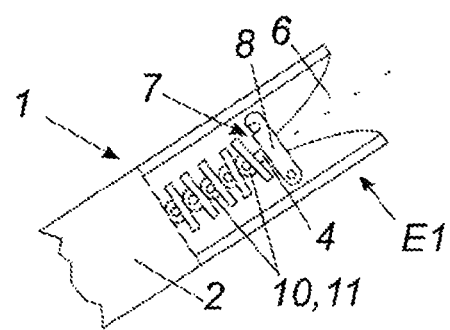

FIGS. 13*a* and 13*b* show a closure device 7 formed by a locking element 8. It is rotatably arranged on the main body 2 and engages with a locking peg to lock the entrance to the slit 4. Once the arrangement device 1 has been filled, this locking element 8 can be closed to prevent the individual wire portions 10 from falling out (see FIG. 13*b*).

Figure 14:
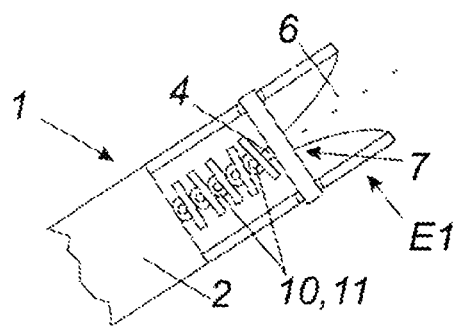
FIG. 14 is a plan view of an end of a proposed arrangement device with an alternative closure device.

FIG. 14 shows another variant of a closure device 7. In this case, an elastic band, preferably a rubber ring (band), is pushed onto the main body 2 as a closure device 7. Recesses in the main body 2 can additionally secure the position of the closure device 7. By way of example, the rubber band engages in slots in order to be able to prevent the rubber ring from inadvertently slipping off.

Figure 15:
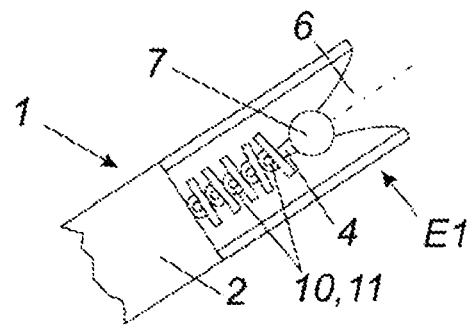
FIG. 15 is a plan view of an end of a proposed arrangement device with an alternative closure device.

FIG. 15 shows a further variant of a closure device 7, which in this case closes the slit 4. Here, the closure device 7 is a moulded part, for example in the form of a plug, which is form-fittingly connected to the slit 4 and/or to the insertion portion 6.

Figure 16:
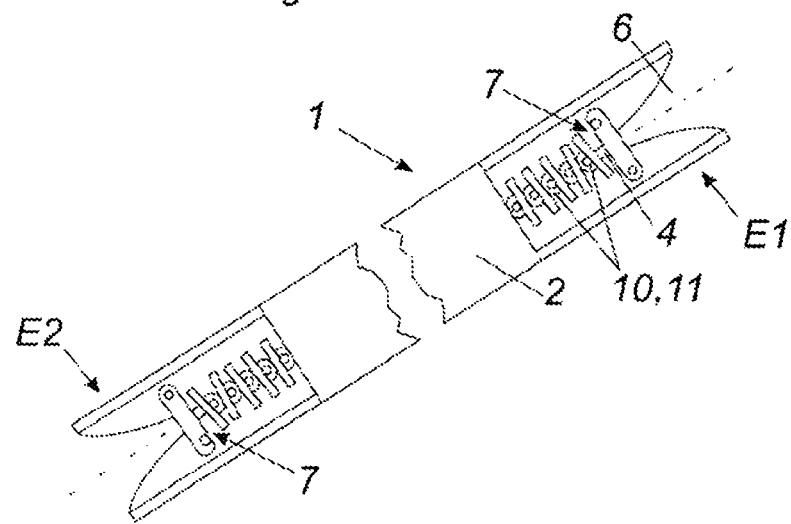
FIG. 16 shows a further embodiment of a proposed arrangement device in a plan view.

FIG. 16 shows the plan view of a further embodiment variant of a proposed arrangement device 1. At both ends E1 and E2 of the slit 4, the arrangement device comprises one insertion portion 6 and one closure device 7. As a result, when the arrangement device 1 is being used on the assembly device 100, there is no need to consider the insertion direction and thus the arrangement device 1 can be filled from both ends E1, E2 and then also closed by the closure device 7.

With this variant it is also possible to select which of the two ends E1, E2 the wire portions 10 are removed from, which may have an impact on their order. Thus, when the arrangement device 1 is being loaded, it can be specified whether, for example, the first introduced wire portion 10 is also the first wire portion 10 to be removed when required during installation, or the last. Where the first inserted wire portion 10 is also the first wire portion 10 to be used, and it has been inserted at the first end E1 and come to rest in the region of the second end E2, then it has to be removed at the opposite end E2. If the sequence is different, and the first inserted wire portion 10 is the wire portion 10 to be used last, then the wire portions 10 inserted at the first end E1 must also be removed again at the first end E1. Instead of the closure devices 7 as shown in FIG. 16, different closure devices 7 can also be used, for example a rubber band or a closure plug, as already shown in the preceding figures.

Figure 17:
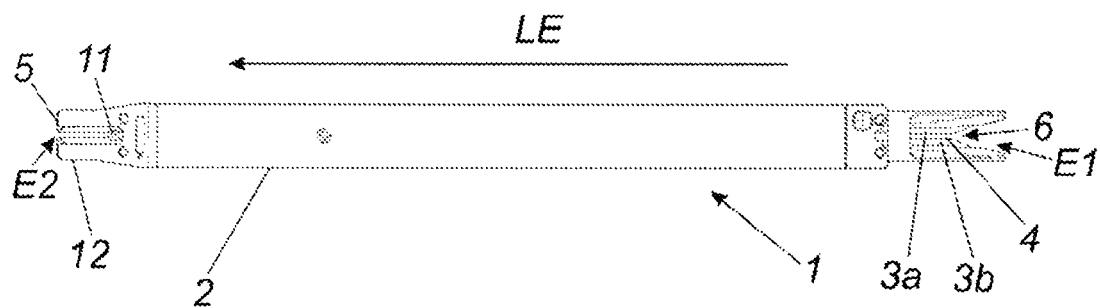
FIG. 17 shows a further embodiment of a proposed arrangement device in a plan view.
Figure 18:
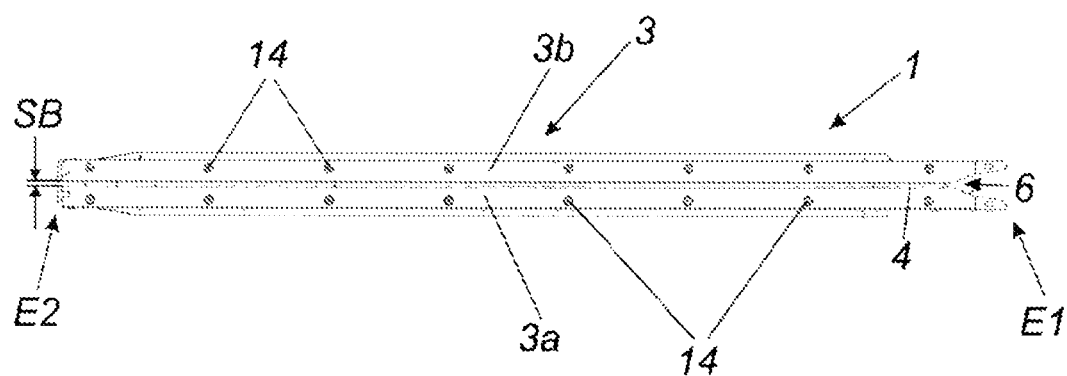
FIG. 18 shows the arrangement device from FIG. 17 in a view from below.
Figure 19:
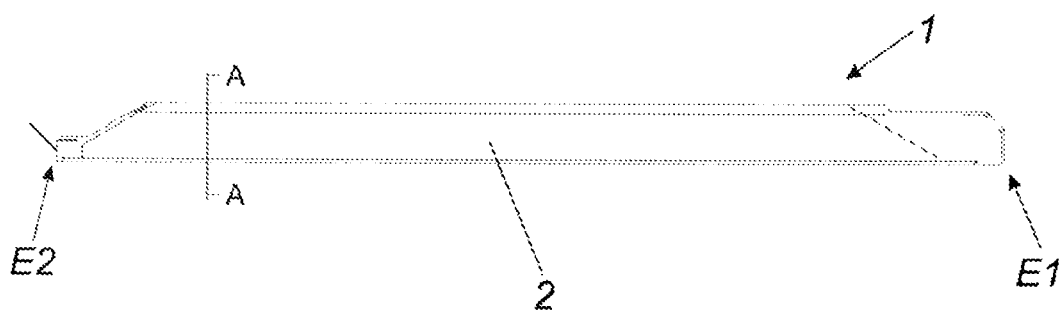
FIG. 19 shows the arrangement device from FIG. 17 in a side view.
Figure 20A:
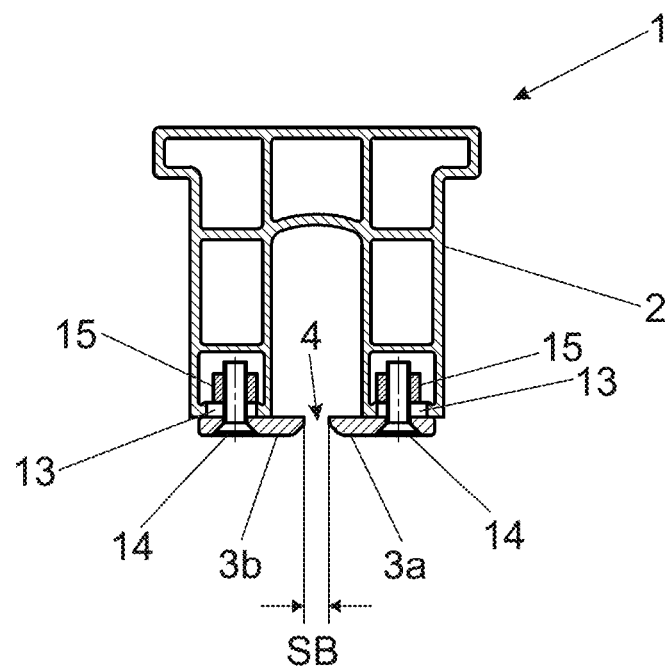
FIGS. 20a-20c are sectional views according to sight line A-A in FIG. 19, FIGS. 21a, 21b are perspective views of a further embodiment of a proposed arrangement device with closure devices that are to be inserted.
Figure 20B:
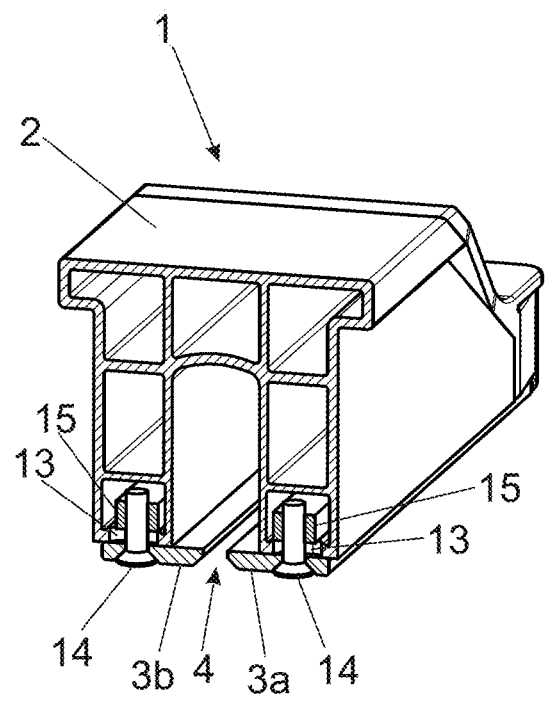
Figure 20C:
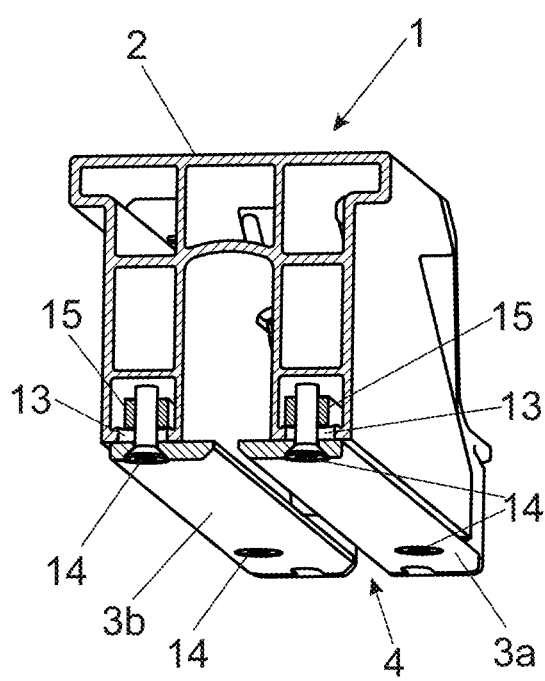

FIG. 17 shows a further embodiment of a proposed arrangement device 1 in a plan view, FIG. 18 shows the arrangement device 1 in a view from below, FIG. 19 shows the arrangement device 1 in a side view, and FIGS. 20a to 20c show sectional views through the arrangement device 1 according to sight line A-A in FIG. 19.

The adjustment device 3 in this embodiment comprises two rails that are movable relative to the main body 2 transversely to the longitudinal extent LE: a first rail 3a and a second rail 3b that can be moved towards one another and/or away from one another in order to adjust the slit width SB. In the process, the end of the first rail 3a facing the second rail 3b forms a first slit width end, and the end of the second rail 3b facing the first rail 3a forms a second slit width end. If the two rails 3a, 3b move towards one another, the slit width SB (from the first slit width end to the second slit width end) can thus be reduced, and if the two rails 3a, 3b move away from one another, the slit width SB can be increased.

Here, a funnel-shaped insertion portion 6 is formed at a first end E1 of the slit 4 in each case, which is created by the fact that the two rails 3a, 3b have correspondingly chamfered end portions. One part of the main body 2 above or opposite the slit 4 has been made available to simplify the insertion of the wire portions 10. A stop portion 5 for stopping the wire portions 10 is arranged at a second end E2 of the slit 4. In this example, the stop portion 5 is arranged on a termination apparatus 12 that can be fitted on an end of the main body 2. The termination apparatus 12 terminates the arrangement device 1 in the region of the second end E2 of the slit 4.

The two rails 3a, 3b are arranged on the main body 2 so as to be movable in a translatory manner in a direction transverse to the longitudinal extent LE. For this purpose, the main body 2 illustrated here has slots 13 that run in a direction transverse to the longitudinal extent LE, with fasteners 14 in the form of screws protruding through the rails 3a, 3b and through the slots 13 (see FIGS. 20a to 20c). The rails 3a, 3b are movable along the slots 13 relative to the main body 2 and can be fastened to the main body 2 by the fasteners 14.

The fasteners 14 in the form of countersunk screws protrude through countersunk holes in the rails 3a, 3b, which are distributed along the longitudinal axis LE, and through the slots 13 milled into the main body 2 at corresponding locations and engage in corresponding threaded bushings 15 on the main body 2. In the example shown, the threaded bushings 15 are incorporated in two threaded strips, which run along the longitudinal extent LE and are movable inside the main body 2 along the slots 13 together with the countersunk screws. In the specific example, these two threaded strips are located in two chambers of the main body 2 formed as an aluminium profile, into which they were inserted by their end faces during production of the arrangement device 1. The threaded strips receive the countersunk screws and ensure that the rails 3a, 3b can be moved in a continuous manner in relation to the main body 2 and that the rails 3a, 3b can be locked by clamping. When the screws are in the loosened state, the rails 3a, 3b can be moved along the slots 13 (the screws acting as guide pins in the process) and, at the desired slit width SB, the rails 3a, 3b can be secured in a simple manner by tightening the screws into the threaded bushings 15, clamping the rails 3a, 3b between screws and main body 2.

Figure 21A:
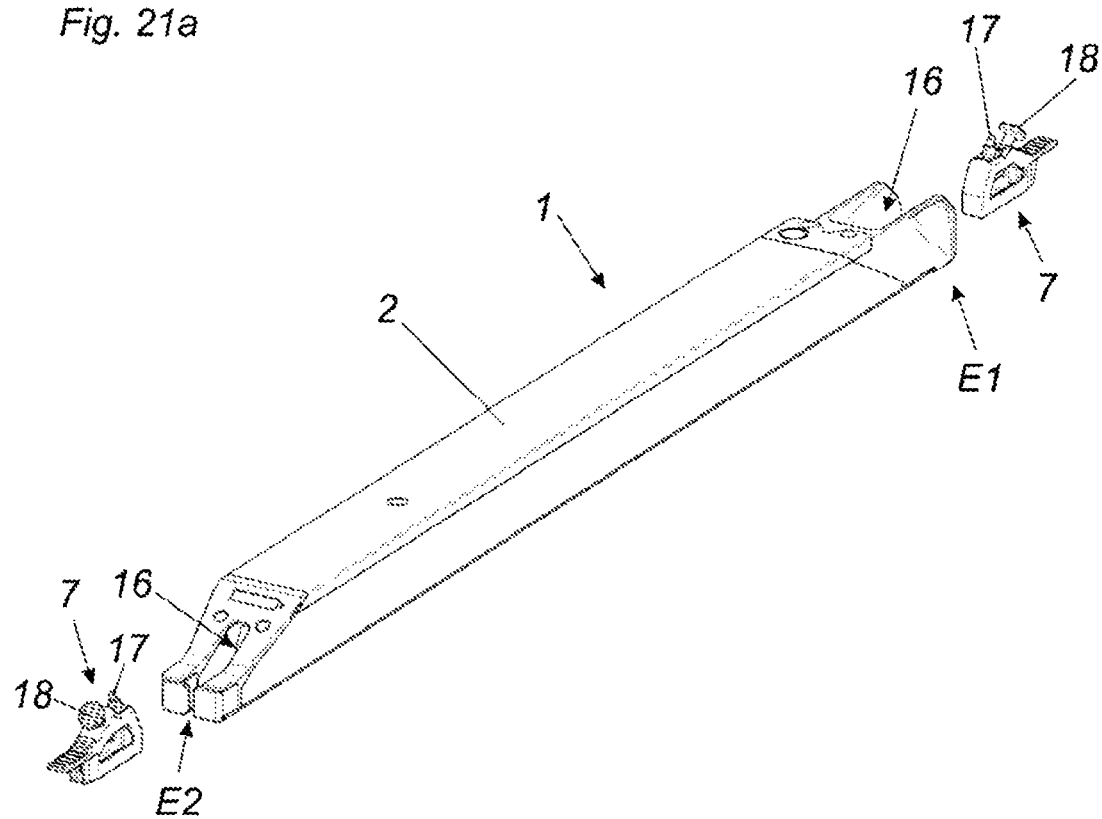
Figure 21B:
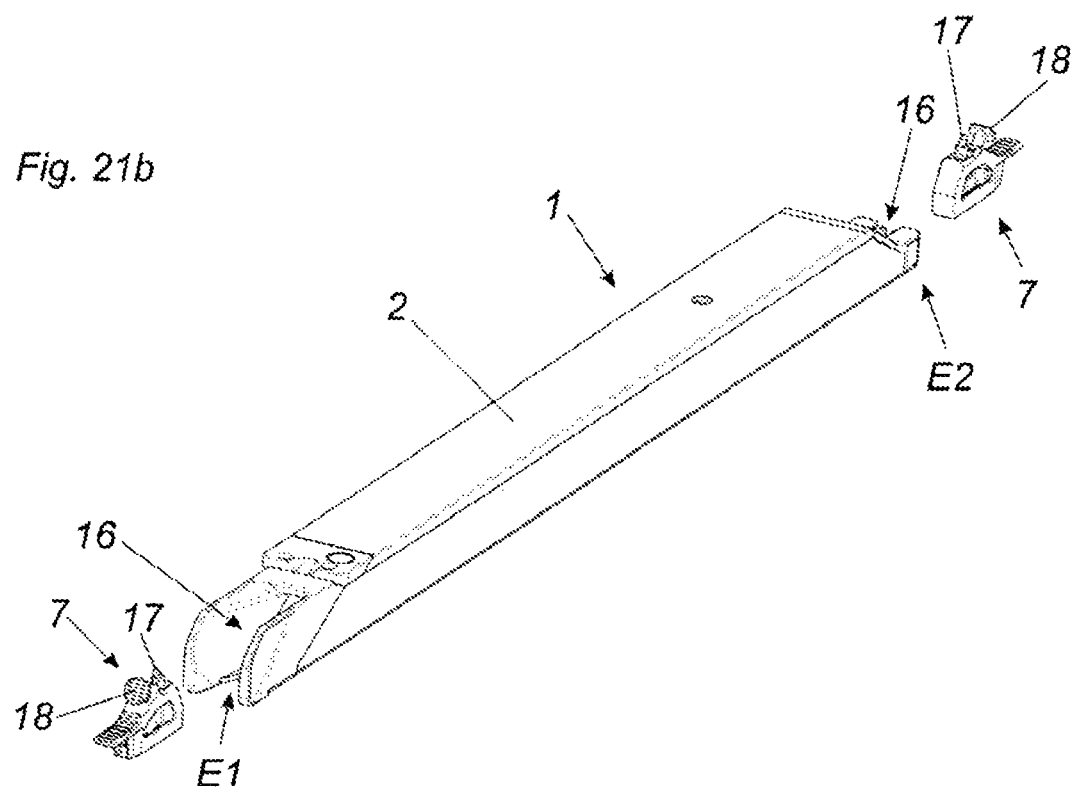

FIGS. 21a and 21b show perspective views of a further embodiment of a proposed arrangement device 1 with closure devices 7 that are to be inserted. Here, the closure devices 7 are configured as inserts that can be inserted into corresponding recesses 16 in the main body 2 in the region of the two ends E1, E2 of the slit 4 and locked to the main body 2. For this purpose, the closure devices 7 have spring-loaded snap-in lugs 17, which, when in the inserted position in the main body 2, catch with corresponding latching receptacles in the main body 2 and secure the closure devices 7 in a stationary manner. To remove the closure devices 7, the spring-loaded snap-in lugs 17 can be moved counter to the action of the spring force by an actuation apparatus 18 and thus pushed out of the latching receptacles.

Figure 22A:
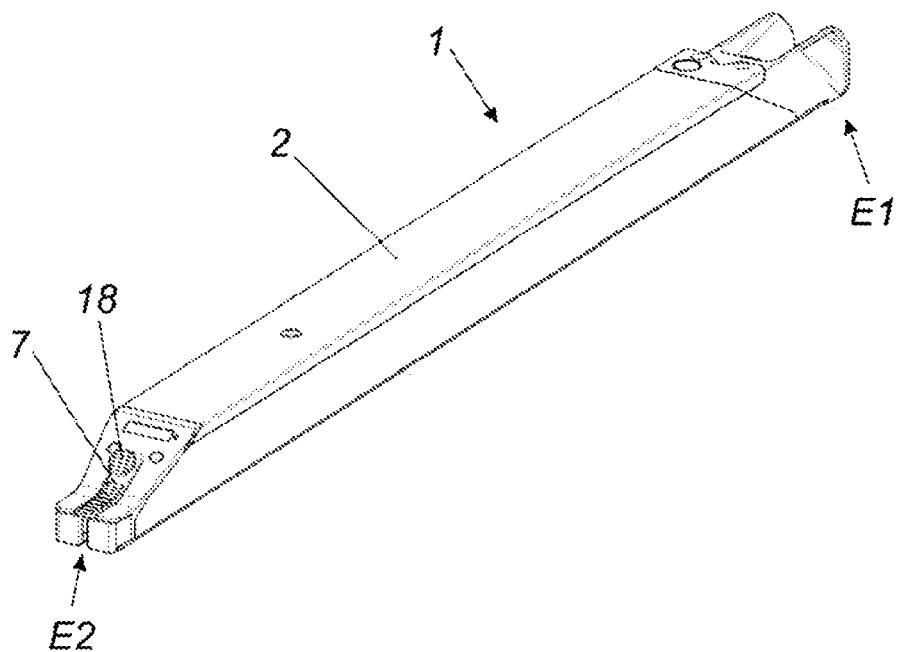
FIGS. 22a, 22b are perspective views of the arrangement device from FIGS. 21a and 21b with inserted closure devices.
Figure 22B:
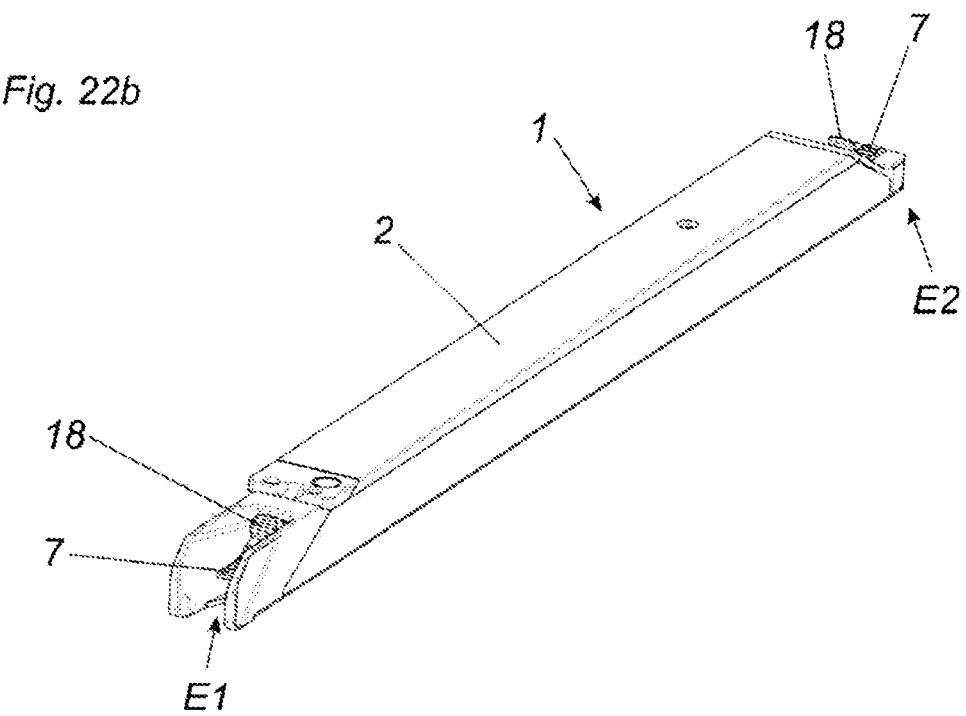

FIGS. 22a and 22b show perspective views of the arrangement device 1 from FIGS. 21a and 21b with closure devices 7 inserted into the main body 2.

Figure 23:
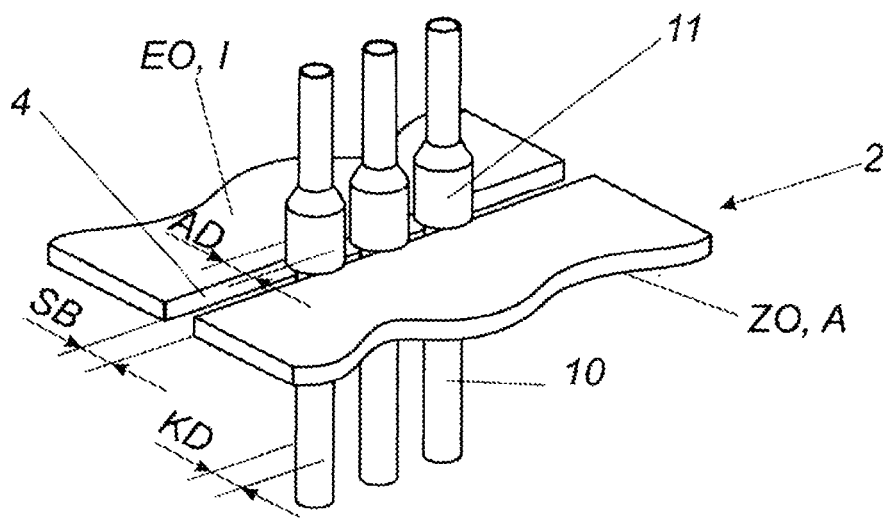
FIG. 23 is a perspective detailed view of a slit in a proposed arrangement device.
Figure 24:
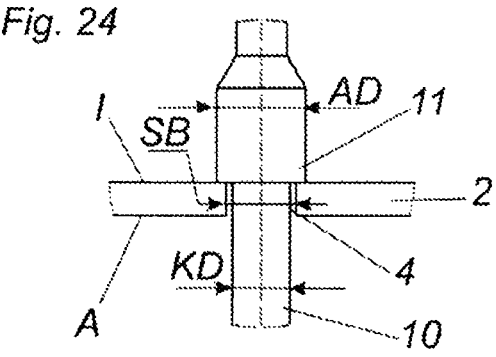
FIG. 24 is a front view of the slit according to FIG. 23, FIGS. 25-27 show wire portions with different variants of wire terminations.

FIGS. 23 and 24 show the dimensions of the slit width SB in relation to the dimensions of the wire diameter KD of the individual wire portions 10. Also shown is how the wire terminations 11 are prevented from slipping through the slit 4 by their overlap over the portions of the arrangement device 1 forming the slit width SB. The wire terminations 11 rest on a first surface EO, or also on the inside I, of the main body 2 in a form-fitting manner. On the opposite, second surface ZO, or also on the outside A, of the main body 2, the wire portions 10 protrude out of the slit 4. The slit width SB substantially corresponds to the diameter KD of the individual wire portions 10. To simplify and improve the sliding properties along the slit 4, the slit width SB can be greater than the wire diameter KD of the wire portions 10. However, the size of the slit width SB must not exceed the size of the termination diameter AD of the wire terminations 11. The slit width SB is thus the same size as, or slightly larger than, the wire diameter KD, but smaller than the termination diameter AD. This is additionally illustrated in FIG. 24, which shows a front view of FIG. 23.

Figure 25:
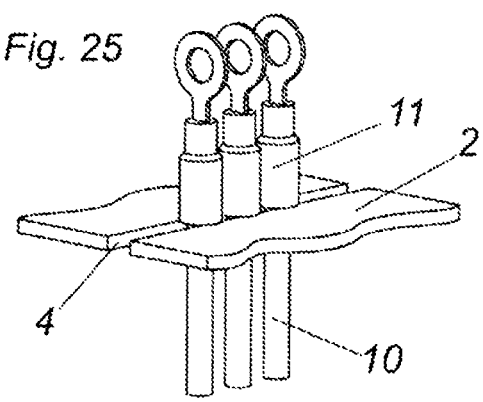
Figure 26:
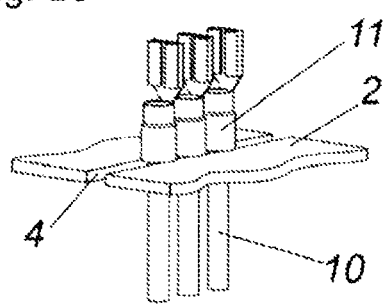
Figure 27:
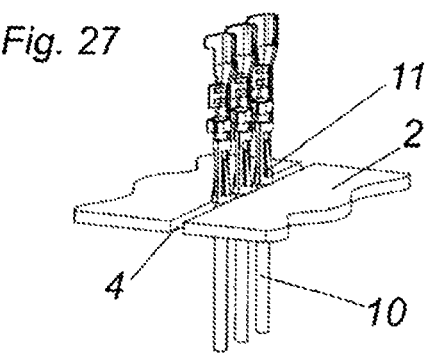

FIGS. 25 to 27 show different variants of wire terminations 11. FIG. 25 shows cable lugs, FIG. 26 shows the female contact elements of flat connectors and FIG. 27 shows crimp contacts. However, all other elements, e.g., shrink-on sleeves, cable sleeves, support sleeves or the like, can also be used as wire termination 11 instead of the wire terminations shown by way of example in FIGS. 25 to 27. What is important is that the overlap formed by the wire terminations 11 is greater than the slit width SB (see FIG. 24).

Figure 28:
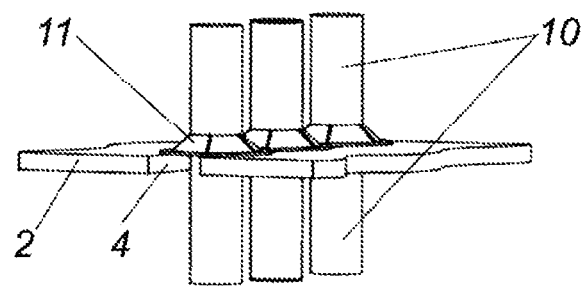
FIG. 28 shows wire portions with transportation securing devices.

FIG. 28 shows how it is possible also to mount wire portions 10 that have been merely cut to length, without any wire terminations 11 arranged thereon in the form of an end sleeve or a similar contact element, along a slit 4. For this purpose, fitted transportation securing devices serve as wire termination 11. These can be removed from the wire portion 10 once the wire portions 10 have been removed or are automatically removed when the wire portion 10 is removed from the slit 4.

Figure 29:
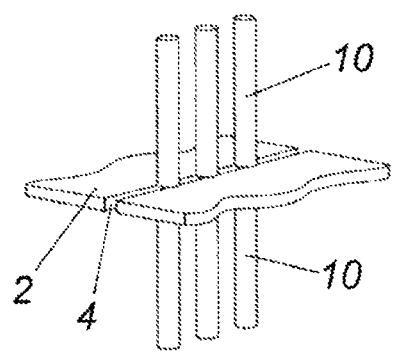
FIG. 29 is a perspective detailed view of a slit in a proposed arrangement device.
Figure 30:
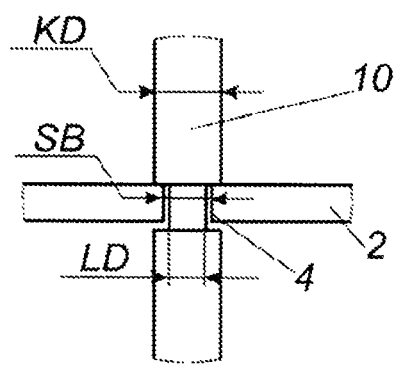
FIG. 30 is a front view of the slit according to FIG. 29, FIGS. 31a-31d show different slit variants.

FIGS. 29 and 30 show a further variant. In this case, partially stripped wire portions 10 are mounted in the slit 4. This is shown in detail in FIG. 30, in which the insulation of the wire portion 10 has been cut and pushed along the stranded core of the wire portion 10, and thus a portion of the stranded core is exposed. The stranded-core diameter LD thus serves as a reference for the slit width SB. In this case, the slit width SB is substantially the same as the stranded-core diameter LD but no greater than the wire diameter KD. When the wire portion 10 is needed, it can be pulled by its longer piece hanging out of the arrangement device 1; in the process, the partially separated insulation on the short end and in the interior of the arrangement device 1 is detached and the wire portion 10 can be used directly without being stripped. However, the wire portion 10 can also simply be pushed out of the slit 4 in the entirely normal way if the partially stripped section or the partial insulation is to remain intact.

Figure 31A:
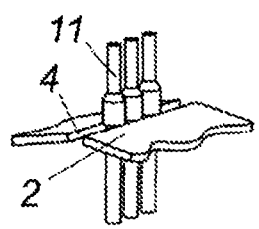
Figure 31B:
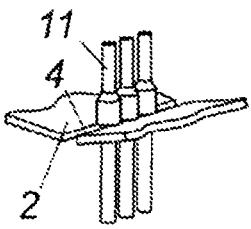
Figure 31C:
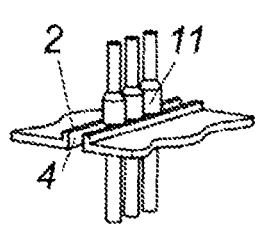
Figure 31D:
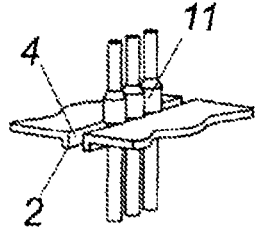

FIGS. 31*a* to 31*d* show different variants of the slit 4 in the main body 2. These are intended to simplify or otherwise influence the threading and unthreading of the individual wire portions 10 into and out of the slit 4. In this case, FIG. 31*a* shows a main body 2 that bulges in the direction of the wire terminations 11, the slit 4 being formed at the highest point thereof. FIG. 31*b* shows the exact opposite situation, in which the main body 2 bulges downwards and the slit 4 is located at the lowest portion. FIG. 31*c* forms a bar (ridge) that points upwards and in FIG. 31*d* the bar (ridge) points downwards. These different embodiment variants could, for example, be used with different wire terminations 11 in order to be able to protect or surround them according to their shape.

Figure 32A:
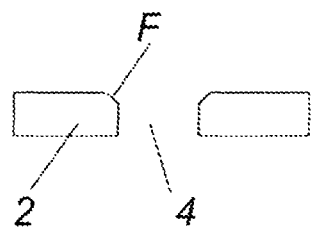
FIGS. 32a-32d show different transitions from the main body into the slit.
Figure 32B:
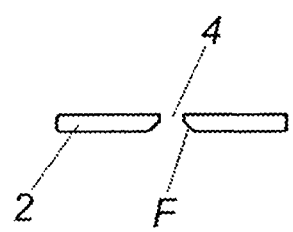
Figure 32C:
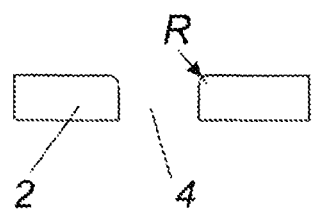
Figure 32D:
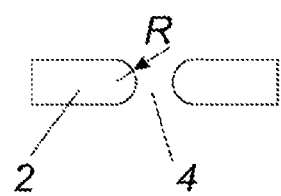

FIGS. 32*a* to 32*d* show different geometries of the slit 4. By way of example, FIG. 32*a* shows the cross section of the main body 2 through which the slit 4 runs. In this case, the transition from the main body 2 into the slit 4 is formed by a chamfer F. FIG. 32*b* shows a further variant of a transition from the main body 2 into the slit 4 by a chamfer F. FIG. 32*c* shows how the transition from the main body 2 into the slit 4 is formed by a radius R. In FIG. 32*d*, the portions of the main body 2 that delimit the slit 4 have a rounded part with a radius R.

LIST OF REFERENCE SIGNS

1 Arrangement device
2 Main body
3 Adjustment device
3*a* First rail
3*b* Second rail
4 Slit
5 Stop portion
6 Insertion portion
7 Closure device
8 Locking element
9 Projection
10 Individual pre-assembled wire portions
11 Wire termination
12 Termination apparatus
13 Slot
14 Fastener
15 Threaded bushing
16 Recess in the main body
17 Snap-in lug
18 Actuation apparatus
100 Assembly device
101 Transfer device
102 Advancing device
103 Supply portion
104 Preparation portion
105 Working portion
LE Longitudinal extent of the main body
E1 First end of the slit
E2 Second end of the slit
SB Slit width
KD Wire diameter
EO First surface of the main body
I Inside of the main body
ZO Second surface of the main body
A Outside of the main body
AD Termination diameter
LD Stranded-core diameter
F Chamfer
R Radius

The invention claimed is:

1. An assembly device for assembling or pre-assembling wire portions, the assembly device comprising:
   a preparation portion, and
   an arrangement device to be detachably attached to the preparation portion to receive assembled or pre-assembled wire portions, the arrangement device including:
      a main body having a slit therein, the slit extending along a longitudinal axis of the main body to allow the wire portions to be strung along the slit, and
      an adjustment device configured to allow adjustment of a slit width of the slit, the slit width being a space between two opposed longitudinally-extending ends of the arrangement device.

2. The assembly device according to claim 1, wherein the adjustment device includes a rail arranged on the main body and movable relative to the main body.

3. The assembly device according to claim 2, wherein the rail is mounted on the main body in a translatory manner by a linear guide.

4. The assembly device according to claim 2, wherein the main body has a slot extending in a direction transverse to the longitudinal axis, the adjustment device including a fastener protruding through the rail and through the slot, wherein the rail is movable along the slot relative to the main body and is fastenable to the main body by the fastener.

5. The assembly device according to claim 4, wherein the fastener is a screw.

6. The assembly device according to claim 2, wherein the rail extends along the longitudinal axis of the main body.

7. The assembly device according to claim 6, wherein the rail extends along an entirety of the slit in the main body.

8. The assembly device according to claim 2, wherein the rail is movable relative to the main body in either a stepwise or a continuous manner.

9. The assembly device according to claim 2, wherein the adjustment device is configured to lock a position of the rail relative to the main body.

10. The assembly device according to claim 2, wherein the arrangement device includes a projection on the main body, the projection forming a first slit width longitudinally-extending end, and the movable rail forming a second slit width longitudinally-extending end opposing the projection, the second slit width longitudinally-extending end being movable relative to the first slit width longitudinally-extending end to adjust the slit width.

11. The assembly device according to claim 2, wherein the rail is a first rail, the adjustment device further including a second rail, the first rail and the second rail being movable relative to the main body transversely with respect to the longitudinal axis of the main body towards one another and/or away from one another in order to adjust the slit width.

12. The assembly device according to claim 2, wherein the rail is movable relative to the main body in a direction transverse to the longitudinal axis of the main body.

13. The assembly device according to claim 1, wherein the main body has a rod-shaped hollow-chamber profile.

14. The assembly device according to claim 1, wherein the slit has a first end and a second end, the first end having an insertion portion for allowing insertion of the individual wire portions into the slit, the second end having a stop portion for stopping the wire portions from sliding out of the slit.

15. The assembly device according to claim 1, wherein the arrangement device includes a closure device at the slit, the closure device being configured to prevent the wire portions from sliding out of the slit.

16. The assembly device according to claim 1, further comprising a plurality of assembled or pre-assembled wire portions, a wire termination being arranged on each of the wire portions, the slit having a minimum slit width substantially corresponding to a wire diameter of each of the wire portions, and having a maximum slit width is smaller than a termination diameter of the respective wire termination of each of the wire portions.

17. The assembly device according to claim 1, wherein the slit of the arrangement device is configured such that a connection between each of the assembled or pre-assembled wire portions and the arrangement device is form-fitting.

18. The assembly device according to claim 1, further comprising a transfer device configured to transfer the assembled or pre-assembled wire portions from the preparation portion into the arrangement device.

19. The assembly device according to claim 1, further comprising an advancing device configured to move individual wire portions along the arrangement device.

20. The assembly device according to claim 1, wherein the arrangement device is supported such that the longitudinal axis of the main body and the slit extending therein are oriented obliquely with respect to the horizontal plane so that the wire portions slide down along the slit due to gravity, as far as a stop portion or an adjacent wire portion.

21. An assembly device for assembling or pre-assembling wire portions, the assembly device comprising:
a preparation portion, and
an arrangement device to be detachably attached to the preparation portion to receive assembled or pre-assembled wire portions, the arrangement device including:
a main body having a slit therein, the slit extending along a longitudinal axis of the main body to allow the wire portions to be strung along the slit,
an adjustment device configured to allow adjustment of a slit width of the slit, and
a rail arranged on the main body and movable relative to the main body,
wherein the main body has a slot extending in a direction transverse to the longitudinal axis, the adjustment device including a fastener protruding through the rail and through the slot, wherein the rail is movable along the slot relative to the main body and is fastenable to the main body by the fastener.

22. An assembly device for assembling or pre-assembling wire portions, the assembly device comprising:
a preparation portion, and
an arrangement device to be detachably attached to the preparation portion to receive assembled or pre-assembled wire portions, the arrangement device including:
a main body having a slit therein, the slit extending along a longitudinal axis of the main body to allow the wire portions to be strung along the slit,
an adjustment device configured to allow adjustment of a slit width of the slit,
a rail arranged on the main body and movable relative to the main body, and
a projection on the main body,
wherein the projection forms a first slit width longitudinally extending end, and the movable rail forms a second slit width longitudinally-extending end opposing the projection, the second slit width longitudinally-extending end being movable relative to the first slit width longitudinally-extending end to adjust the slit width.

* * * * *